United States Patent
Ohmura et al.

(10) Patent No.: US 9,509,095 B2
(45) Date of Patent: Nov. 29, 2016

(54) CHARGING CONNECTOR

(71) Applicants: YAZAKI CORPORATION, Minato-ku, Tokyo (JP); NISSAN MOTOR CO., LTD., Yakohama-shi, Kanagawa (JP)

(72) Inventors: Takenori Ohmura, Shizuoka (JP); Tsuyoshi Nakajima, Kanagawa (JP)

(73) Assignees: YAZAKI CORPORATION, Tokyo (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/863,809

(22) Filed: Sep. 24, 2015

(65) Prior Publication Data

US 2016/0020555 A1    Jan. 21, 2016

Related U.S. Application Data

(63) Continuation of application No. PCT/JP2014/058272, filed on Mar. 25, 2014.

(30) Foreign Application Priority Data

Mar. 28, 2013  (JP) .................................. 2013-069004

(51) Int. Cl.
  *H01R 13/633*  (2006.01)
  *H01R 13/639*  (2006.01)
  (Continued)

(52) U.S. Cl.
  CPC ......... *H01R 13/633* (2013.01); *B60L 11/1818* (2013.01); *H01R 13/639* (2013.01); *H01R 13/6275* (2013.01); *Y02T 10/7005* (2013.01); *Y02T 10/7072* (2013.01); *Y02T 90/14* (2013.01)

(58) Field of Classification Search
  CPC .......... B60L 11/1818; H01R 13/6275; H01R 13/62933; H01R 13/633; H01R 13/6335
  See application file for complete search history.

(56) References Cited

U.S. PATENT DOCUMENTS 5,350,312 A * 9/1994 Kuno .................. B60L 11/1818
                                                     439/310
5,417,579 A * 5/1995 Yoshioka ............ B60L 11/1818
                                                     439/310

(Continued)

FOREIGN PATENT DOCUMENTS

CN         1902790 A      1/2007
CN       102017320 A      4/2011

(Continued)

OTHER PUBLICATIONS

Chinese Official Action issued on Sep. 2, 2016 in the counterpart Chinese patent application.

(Continued)

*Primary Examiner* — Ross Gushi
(74) *Attorney, Agent, or Firm* — Mots Law, PLLC

(57) ABSTRACT

A charging connector in accordance with the present invention includes: connector cases that house a connector fitting portion; a locking arm in which a locking claw retractable from an outer peripheral surface of the connector fitting portion is provided at a tip, and that rocks centering around a shaft core between a locking position and a releasing position; and a coil spring that biases the locking arm toward the locking position. The locking arm includes a lock releasing portion that is inserted into a through hole formed in the connector cases, and with which the locking arm can be operated to the releasing position from an outside of the connector cases.

4 Claims, 11 Drawing Sheets

(51) Int. Cl.
  *B60L 11/18* (2006.01)
  *H01R 13/627* (2006.01)

(56) References Cited

U.S. PATENT DOCUMENTS

| | | | | |
|---|---|---|---|---|
| 5,545,049 A * | 8/1996 | Hasegawa | B60L 11/1818 | 439/310 |
| 5,556,284 A * | 9/1996 | Itou | B60L 11/1846 | 180/65.1 |
| 5,558,533 A * | 9/1996 | Hashizawa | B60L 11/1818 | 439/310 |
| 5,573,417 A * | 11/1996 | Hashizawa | B60L 11/1818 | 439/310 |
| 5,575,675 A * | 11/1996 | Endo | H01R 13/62933 | 439/310 |
| 5,577,920 A * | 11/1996 | Itou | B60L 11/1846 | 439/310 |
| 5,584,712 A * | 12/1996 | Fukushima | H01R 13/4538 | 439/140 |
| 5,637,977 A * | 6/1997 | Saito | B60L 11/1818 | 320/109 |
| 5,639,256 A * | 6/1997 | Endo | B60L 11/1818 | 439/353 |
| 5,674,086 A * | 10/1997 | Hashizawa | B60L 11/1818 | 439/310 |
| 5,676,560 A * | 10/1997 | Endo | B60L 11/1818 | 439/310 |
| 5,751,135 A * | 5/1998 | Fukushima | B60L 11/1818 | 320/107 |
| 5,803,760 A * | 9/1998 | Ito | B60L 11/1818 | 439/310 |
| 5,820,395 A * | 10/1998 | Hashizawa | B60L 11/1818 | 439/271 |
| 5,873,737 A * | 2/1999 | Hashizawa | B60L 11/1818 | 439/310 |
| 5,906,500 A * | 5/1999 | Kakuta | B60L 11/1818 | 439/310 |
| 6,123,569 A * | 9/2000 | Fukushima | B60L 11/1818 | 439/310 |
| 6,203,355 B1 * | 3/2001 | Neblett | B60L 11/1818 | 439/352 |
| 6,225,153 B1 * | 5/2001 | Neblett | B60L 11/1818 | 438/188 |
| 6,371,768 B1 * | 4/2002 | Neblett | B60L 11/1818 | 439/34 |
| 7,878,866 B1 * | 2/2011 | Kwasny | B60L 11/1818 | 439/474 |
| 7,963,793 B2 * | 6/2011 | Poulin | B60L 11/1818 | 439/34 |
| 8,016,607 B2 * | 9/2011 | Brown, II | B60L 11/1818 | 439/34 |
| 8,075,329 B1 * | 12/2011 | Janarthanam | B60L 11/1818 | 439/304 |
| 8,152,550 B2 * | 4/2012 | Ichio | H01R 13/5227 | 439/304 |
| 8,206,171 B2 * | 6/2012 | Osawa | H01R 13/502 | 439/352 |
| 8,206,184 B2 * | 6/2012 | Kwasny | B60L 11/1818 | 439/474 |
| 8,251,742 B2 * | 8/2012 | Takada | B60L 11/1818 | 439/271 |
| 8,317,534 B2 * | 11/2012 | Osawa | B60L 11/1818 | 439/353 |
| 8,342,856 B2 * | 1/2013 | Takada | H01R 13/521 | 439/246 |
| 8,439,699 B2 * | 5/2013 | Ohmura | H01R 13/62933 | 439/157 |
| 8,500,476 B2 * | 8/2013 | Hori | H01R 13/62944 | 439/310 |
| 8,506,315 B2 * | 8/2013 | Canedo | H01R 13/60 | 439/310 |
| 8,523,589 B2 * | 9/2013 | Kurumizawa | H01R 13/6275 | 439/304 |
| 8,523,596 B2 * | 9/2013 | Inoue | G07C 9/00182 | 439/310 |
| 8,529,273 B2 * | 9/2013 | Maegawa | B60L 11/1818 | 439/206 |
| 8,562,370 B2 * | 10/2013 | Takagi | H01R 13/6275 | 439/345 |
| 8,568,155 B2 * | 10/2013 | Sebald | B60L 11/1818 | 439/304 |
| 8,573,994 B2 * | 11/2013 | Kiko | B60L 3/0069 | 320/109 |
| 8,573,998 B2 * | 11/2013 | Ichio | B60L 11/1818 | 439/358 |
| 8,597,046 B2 * | 12/2013 | Osawa | B60L 11/1818 | 439/469 |
| D697,869 S | 1/2014 | Yamamoto et al. | | |
| 8,678,845 B2 * | 3/2014 | Osawa | H01R 13/502 | 439/352 |
| 8,678,847 B2 * | 3/2014 | Inoue | B60L 11/1818 | 439/352 |
| 8,747,129 B2 * | 6/2014 | Ichio | B60L 11/1818 | 439/135 |
| 8,747,143 B2 * | 6/2014 | Ichio | B60L 11/1818 | 439/358 |
| 8,753,136 B2 * | 6/2014 | Hirashita | B60L 11/1818 | 439/304 |
| 8,758,039 B2 * | 6/2014 | Ishida | B60L 11/123 | 439/352 |
| 8,784,124 B2 * | 7/2014 | Yeon | H01R 13/629 | 439/299 |
| 8,834,202 B2 * | 9/2014 | Kwasny | B60L 11/1818 | 439/604 |
| 8,882,525 B2 * | 11/2014 | Mori | B60L 11/1818 | 439/310 |
| 8,932,072 B2 * | 1/2015 | Tamaki | H01R 13/6272 | 439/345 |
| 9,048,567 B2 * | 6/2015 | Takagi | H01R 13/6275 | |
| 9,054,443 B2 * | 6/2015 | Fukushima | H01R 13/5045 | |
| 9,077,110 B2 * | 7/2015 | Ohmura | H01R 13/6275 | |
| 9,088,101 B2 * | 7/2015 | Toratani | H01R 13/6683 | |
| 9,088,110 B2 * | 7/2015 | Ohmura | H01R 13/6275 | |
| 9,106,014 B2 * | 8/2015 | Ohmura | H01R 13/6275 | |
| 9,106,015 B2 * | 8/2015 | Ohmura | H01R 13/6275 | |
| 9,124,035 B2 * | 9/2015 | Ohmura | H01R 13/641 | |
| 9,147,972 B2 * | 9/2015 | Ohmura | H01R 13/641 | |
| 9,172,182 B2 * | 10/2015 | Toratani | H01R 13/627 | |
| 9,178,312 B2 * | 11/2015 | Nakajima | B60L 11/1825 | |
| 9,199,551 B2 * | 12/2015 | Kahara | B60L 1/003 | |
| 9,209,563 B2 * | 12/2015 | Toratani | H01R 13/639 | |
| 9,225,109 B2 * | 12/2015 | Sasaki | H01R 13/627 | |
| 9,263,830 B2 * | 2/2016 | Sugiyama | B60L 11/1818 | |
| 9,318,845 B2 * | 4/2016 | Ohmura | H01R 13/6275 | |
| 2007/0049099 A1 | 3/2007 | Potters | | |
| 2011/0034053 A1 | 2/2011 | Matsumoto et al. | | |
| 2011/0212645 A1 * | 9/2011 | Osawa | H01R 13/502 | 439/352 |
| 2011/0223792 A1 * | 9/2011 | Osawa | B60L 11/1818 | 439/345 |
| 2011/0281447 A1 * | 11/2011 | Kano | B60L 11/1818 | 439/133 |
| 2011/0287649 A1 * | 11/2011 | Kurumizawa | B60L 11/1818 | 439/304 |
| 2011/0300733 A1 * | 12/2011 | Janarthanam | B60L 11/1818 | 439/304 |
| 2011/0318950 A1 * | 12/2011 | Ichio | B60L 11/1818 | 439/345 |
| 2012/0129378 A1 * | 5/2012 | Kiko | H01R 13/717 | 439/345 |
| 2013/0260595 A1 * | 10/2013 | Tamaki | H01R 13/6272 | 439/345 |
| 2013/0303014 A1 * | 11/2013 | Takagi | H01R 13/6275 | 439/350 |
| 2014/0045362 A1 * | 2/2014 | Ohmura | H01R 13/6275 | 439/345 |
| 2014/0080342 A1 * | 3/2014 | Ohmura | H01R 13/639 | 439/310 |
| 2014/0106586 A1 * | 4/2014 | Boeck | H01R 13/52 | 439/188 |
| 2014/0167695 A1 * | 6/2014 | Shimizu | H01R 13/6275 | 320/109 |
| 2014/0167696 A1 * | 6/2014 | Kahara | B60L 11/1818 | 320/109 |

(56) References Cited

U.S. PATENT DOCUMENTS

| | | | |
|---|---|---|---|
| 2014/0169865 A1* | 6/2014 | Kurumizawa | H01R 13/639 403/322.1 |
| 2014/0170879 A1* | 6/2014 | Kahara | B60L 1/003 439/304 |
| 2014/0170889 A1* | 6/2014 | Kahara | H01R 13/6397 439/352 |
| 2014/0170890 A1* | 6/2014 | Kurumizawa | H01R 13/6397 439/352 |
| 2014/0235086 A1* | 8/2014 | Nakajima | B60L 11/1825 439/347 |
| 2014/0235087 A1* | 8/2014 | Nakajima | B60L 11/1818 439/347 |
| 2014/0235089 A1* | 8/2014 | Nakajima | B60L 11/1818 439/350 |
| 2014/0242818 A1* | 8/2014 | Ohmura | B60L 11/1818 439/155 |
| 2014/0256172 A1* | 9/2014 | Kakizaki | B60L 11/1818 439/350 |
| 2014/0295714 A1* | 10/2014 | Guillanton | H01R 13/111 439/692 |
| 2014/0300320 A1* | 10/2014 | Nakajima | H01R 13/6275 320/109 |
| 2014/0315416 A1* | 10/2014 | Ohmura | H01R 13/641 439/352 |
| 2014/0322949 A1* | 10/2014 | Ohmura | H01R 13/6275 439/352 |
| 2014/0322950 A1* | 10/2014 | Ohmura | H01R 13/641 439/352 |
| 2014/0322951 A1* | 10/2014 | Ohmura | H01R 13/6275 439/352 |
| 2014/0322952 A1* | 10/2014 | Ohmura | H01R 13/6275 439/352 |
| 2014/0329400 A1* | 11/2014 | Kakizaki | B60L 11/1818 439/304 |
| 2014/0357113 A1* | 12/2014 | Fehler | B60L 11/1818 439/367 |
| 2015/0011111 A1* | 1/2015 | Toratani | H01R 13/6683 439/357 |
| 2015/0035478 A1* | 2/2015 | Uchiyama | B60L 1/003 320/107 |
| 2015/0037994 A1* | 2/2015 | Nakajima | H01R 13/6397 439/304 |
| 2015/0155656 A1* | 6/2015 | Sugiyama | B60L 11/1818 439/370 |
| 2015/0207261 A1* | 7/2015 | Fukushima | H01R 13/506 439/701 |
| 2015/0229074 A1* | 8/2015 | Toratani | B60L 11/1816 439/357 |
| 2015/0249305 A1* | 9/2015 | Toratani | H01R 13/639 439/357 |
| 2015/0295344 A1* | 10/2015 | Sawada | B60L 11/1818 439/587 |
| 2016/0020555 A1* | 1/2016 | Ohmura | H01R 13/639 439/153 |
| 2016/0028185 A1* | 1/2016 | Ohmura | H01R 13/5227 439/160 |

FOREIGN PATENT DOCUMENTS

| | | |
|---|---|---|
| CN | 102255198 A | 11/2011 |
| CN | 302298942 S | 1/2013 |
| JP | 2011-138644 A | 7/2011 |
| JP | 2011-238533 A | 11/2011 |
| JP | 2012-234775 A | 11/2012 |
| JP | 2012-243687 A | 12/2012 |
| JP | 2013-008465 A | 1/2013 |
| JP | 2013-149384 A | 8/2013 |

OTHER PUBLICATIONS

Search Report issued on Sep. 23, 2016 in the counterpart European application.

* cited by examiner

CHARGING CONNECTOR

CROSS REFERENCE TO RELATED APPLICATIONS

This application is a Continuation of PCT Application No. PCT/JP2014/058272 filed on Mar. 25, 2014, and claims the priority of Japanese Patent Application No. 2013-069004 filed on Mar. 28, 2013, the content of both of which is incorporated herein by reference.

TECHNICAL FIELD

The present invention relates to charging connectors and, in particular, to a charging connector that is fitted to a vehicle-side inlet provided in a vehicle.

BACKGROUND ART

In recent years, for measures against environmental problems, an electrically driven vehicle (for example, an electric vehicle (EV) and a hybrid electric vehicle (HEV)) that can travel by driving a motor by means of electric power of a storage battery (hereinafter, a battery) mounted thereon has been spread. Expansion of battery chargers has been achieved as infrastructure development for the spread. One example of a charging connector of the battery charger side will be explained with reference to FIG. 11.

As shown in FIG. 11, a charging connector 100 includes: a connector case 110 that houses a connector fitting portion 111 that is fitted to a vehicle-side inlet (not shown) as a counterpart connector; a locking arm 120; and a releasing lever 140. A locking claw 121 is provided at a tip of the locking arm 120, and the locking arm 120 is configured to rock centering around a rocking shaft 122 between a locking position where the locking claw 121 engages with the vehicle-side inlet, and a releasing position where the engagement of the vehicle-side inlet and the locking claw 121 is released. A coil spring 130 that biases the locking arm 120 toward the locking position is provided at the releasing lever 140, and when a user operates the releasing lever 140, the releasing lever 140 releases latching of the vehicle-side inlet and the locking claw 121.

When such charging connector 100 is inserted in the vehicle-side inlet, the locking claw 121 of the locking arm 120 comes into contact with an inner peripheral surface of the vehicle-side inlet to be pushed in the connector fitting portion 111. When the charging connector 100 is then inserted into a deepest part of the vehicle-side inlet (i.e., it becomes a completely fitted state), the locking claw 121 of the locking arm 120 projects from an outer peripheral surface of the connector fitting portion 111, and is latched to a concave portion (not shown) provided at the inner peripheral surface of the vehicle-side inlet. The charging connector 100 is locked to the vehicle-side inlet by the latching of the concave portion (not shown) provided at the inner peripheral surface of the vehicle-side inlet and the locking claw 121.

Meanwhile, when the charging connector 100 is removed from the vehicle-side inlet after electric power is supplied to a battery, the user performs pushing operation of the releasing lever 140, the releasing lever 140 abuts against the locking arm 120, and the locking arm 120 rocks to the releasing position. As a result of this, the locking claw 121 of the locking arm 120 becomes a state of being pushed into the connector fitting portion 111, and the charging connector 100 can be removed from the vehicle-side inlet.

By the way, when a failure (breakage or entry of foreign substances) occurs in the releasing lever 140, there is a possibility of causing a situation where the releasing lever 140 does not operate normally, the locking claw 121 of the locking arm 120 cannot be pushed into the connector fitting portion 111, and where the latching of the concave portion (not shown) of the vehicle-side inlet and the locking claw 121 cannot be released. Such situation leads to difficulty in removing the charging connector 100 from the vehicle-side inlet.

Consequently, in the above-mentioned charging connector 100, a through hole 112 is provided in an upper part of the connector case 110, thereby the user can insert a jig (not shown) into the through hole 112 to push the locking claw 121 of the locking arm 120 into the connector fitting portion 111, and the latching of the concave portion (not shown) of the vehicle-side inlet and the locking claw 121 can be released even when the failure occurs in the releasing lever 140. As a result of this, even though the failure occurs in the releasing lever 140, the charging connector 100 can be removed from the vehicle-side inlet.

CITATION LIST

Patent Literature

Patent Literature 1: Japanese Patent Laid-Open Publication No. 2012-234775

SUMMARY OF INVENTION

Technical Problem

However, in the above-mentioned conventional charging connector 100, foreign substances, such as dust, may enter the through hole 112, and in this case, it becomes difficult to remove the charging connector 100 from the vehicle-side inlet. In addition to that, there was also a possibility that the jig might touch various parts (for example, an electric wire) in the connector case 110 in inserting the jig into the through hole 112.

The present invention has been made in order to solve the above-mentioned problems, and an object thereof is to provide a charging connector that can rock a locking arm so as to be at a releasing position from an outside of a connector case, and moreover, can prevent a jig from touching various parts in the connector case, even though a latching state of a vehicle-side inlet and a locking claw of the locking arm cannot be released by normal operation of a releasing lever.

Solution to Problem

In order to solve the above-mentioned problems, the present invention has the following features. First, a first feature of the present invention is a charging connector including: a connector case that houses a connector fitting portion that is fitted to a counterpart connector; a locking arm in which a locking claw retractable from an outer peripheral surface of the connector fitting portion is provided at a tip, and that rocks centering around a rocking shaft between a locking position where the locking claw engages with the counterpart connector and a releasing position where engagement of the counterpart connector and the locking claw is released; and a biasing member that biases the locking arm toward the locking position, in which the locking arm includes a lock releasing portion that is inserted into a through hole formed in the connector case, and with which the locking arm can be operated to the releasing position from an outside of the connector case.

As an other feature, it is preferable that the lock releasing portion is configured by a rocking shaft of the locking arm.

As an other feature, it is preferable that a cap to close the through hole is applied to the through hole.

As an other feature, it is preferable that a latching portion is provided at either one of the through hole and the cap, and that a latched portion to which the latching portion is latched is provided at the other.

DESCRIPTION OF EMBODIMENTS

Next, embodiments of a charging connector in accordance with the present invention will be explained with reference to drawings.

Note that a same or a similar symbol is attached to a same or a similar portion in the following description of the drawings. However, it is to be noted that the drawings are schematically shown, and that a ratio of each dimension, etc. are different from actual components. Accordingly, specific dimensions etc. should be determined in consideration of the following explanation. In addition, different portions in mutual dimensional relations and ratios can be included among the drawings.

(Configuration of Charging Connector)

First, a configuration of a charging connector 1 in accordance with the embodiment will be explained with reference to the drawings. FIGS. 1 to 4 are views showing the charging connector 1 in accordance with the embodiment.

Here, in order to give facilities to explanation, a vehicle-side inlet 90 side (left sides of FIGS. 1 to 3 and a right side of FIG. 4), which is a counterpart in the charging connector 1, is set as a "tip side", and a direction toward the tip side is set as a "fitting direction FD". In addition, a side opposite to the vehicle-side inlet 90 side (right sides of FIGS. 1 to 3 and a left side of FIG. 4) in the charging connector 1 is set as a "rear end side", and a direction toward the rear end side is set as a "separating direction SD".

As shown in FIGS. 1 to 4, the charging connector 1 is fitted to the vehicle-side inlet 90 (refer to FIG. 2) at which a receiving-side terminal (not shown) has been provided, and is utilized to supply electric power to a battery of a vehicle. The charging connector 1 is attached to a tip of an electric wire W (not shown) extended from a power supply device (not shown).

Figure 2:
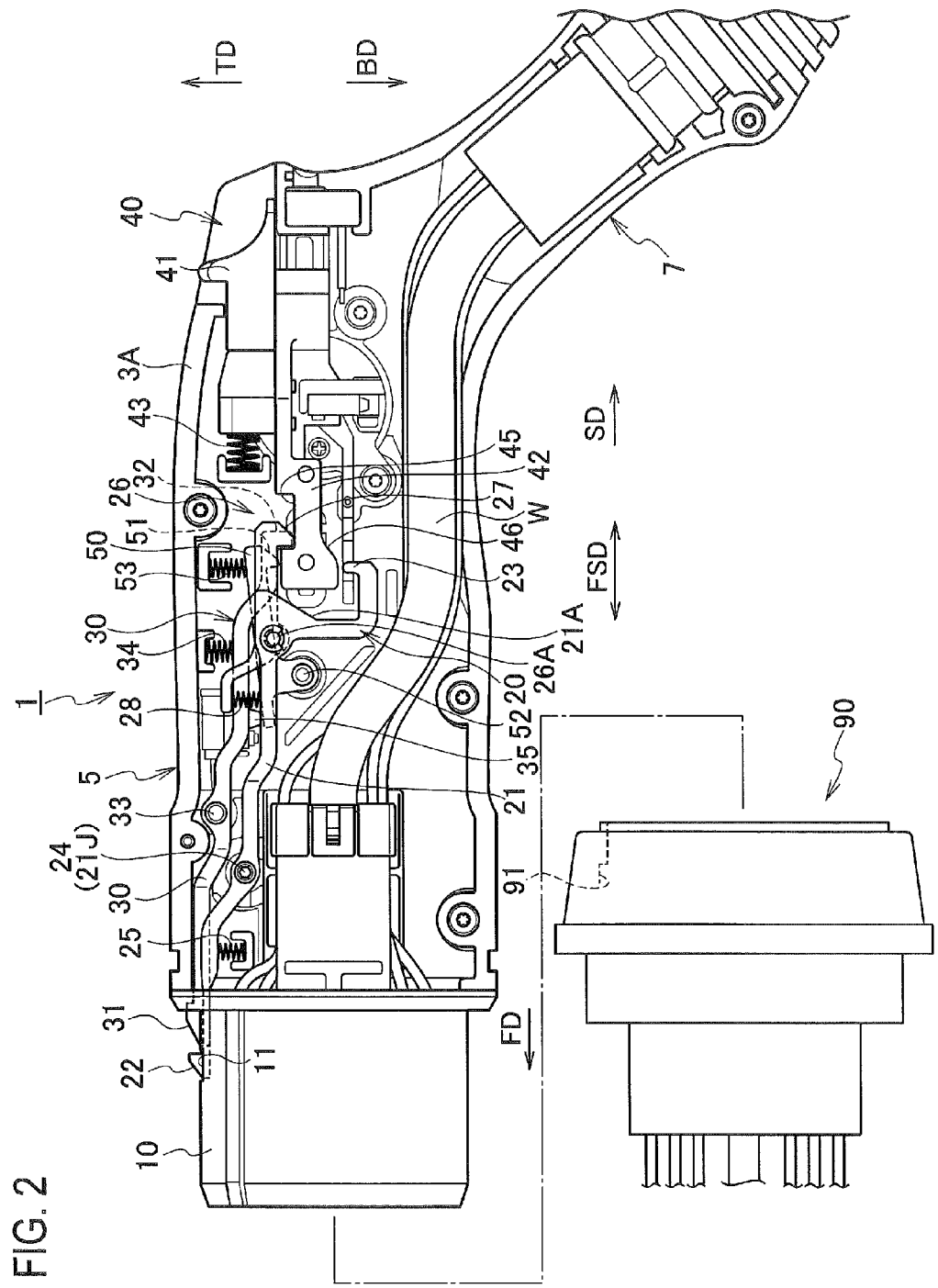
FIG. 2 is a view showing an inside of the charging connector in accordance with the embodiment.

The charging connector 1 includes connector cases 3A, 3B as substantially mirror-image symmetrical two divided bodies whose mutual end surfaces are combined with each other. The connector cases 3A, 3B have a case body portion 5 and a handle portion 7 inclined from a rear of the case body portion 5 and held by a worker. FIG. 2 shows a state where the connector case 3B of the charging connector 1 is removed, and where the charging connector 1 is seen from a direction perpendicular to mirror-image symmetrical surfaces of the connector cases 3A, 3B.

Here, although the connector cases 3A, 3B are set as the substantially mirror-image symmetrical two divided bodies whose mutual end surfaces are combined with each other, the connector cases 3A, 3B may just be combined with each other to thereby configure an exterior of the charging connector 1, and need not necessarily be strictly mirror-image symmetrical.

A connector fitting portion 10 that is fitted to the vehicle-side inlet 90 is provided in front of such case body portion 5. A notch 11 is formed in an outer peripheral surface of the connector fitting portion 10. A supplying-side terminal (not shown) that is connected to the receiving-side terminal (not shown) in the vehicle-side inlet 90 is stored inside the connector fitting portion 10. Note that alignment of the supplying-side terminal (not shown), etc. are compliant with various standards, and that explanation thereof will be omitted here.

A through hole 6 is formed in a tip side of the case body portion 5. The through hole 6 is configured by a cap inserting portion 6A to which a cap 9 to close the through hole 6 is applied, and a shaft core inserting portion 6B in which a lock releasing portion 24, which will be mentioned later, of the locking arm 20 is inserted. A size and a contour shape of the through hole 6 (the cap inserting portion 6A and the shaft core inserting portion 6B) are preferably substantially equal to respective sizes and contour shapes of the cap 9 and the lock releasing portion 24 in order to prevent entry of foreign substances (dust, water, etc.). In addition, the shape of the cap 9 can be appropriately set and, for example, may just achieve a level to be able to seal the cap inserting portion 6A, and may be a columnar body or a frustum shape, etc.

In a state where the lock releasing portion 24 of the locking arm 20 is inserted in the shaft core inserting portion 6B, a tip of the lock releasing portion 24 projects or is exposed to an inside of the through hole 6 from the shaft core inserting portion 6B, and a gap between the shaft core inserting portion 6B and the lock releasing portion 24 is sealed. For that reason, foreign substances (dust, water, etc.) are prevented from entering insides of the connector cases 3A, 3B through the shaft core inserting portion 6B of the through hole 6. Furthermore, a jig is prevented from being inserted in the connector cases 3A, 3B from the shaft core inserting portion 6B of the through hole 6. Furthermore, the lock releasing portion 24 is arranged at a position where the jig can be inserted into the lock releasing portion 24.

Figure 4:
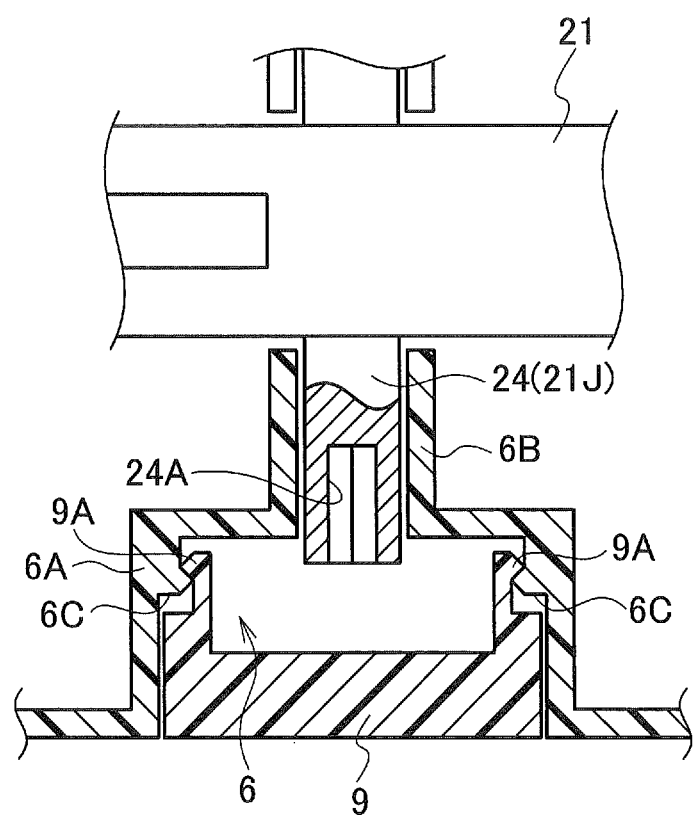
FIG. 4 is a cross-sectional view showing a part of a connector case and a cap in accordance with the embodiment.

FIG. 4 is the cross-sectional view showing a part of the connector case 3B and the cap 9. In FIG. 4, there is shown a cross section in a surface perpendicular to the mirror-image symmetrical surfaces of the connector cases 3A, 3B and parallel to the fitting direction FD. As shown in FIG. 4, a latching portion 9A is provided at a peripheral wall of the cap 9, and a latched portion 6C to which the latching portion 9A is latched is provided at a side wall of the cap inserting portion 6A. That is, the cap 9 is a removable type that closes the through hole 6 and the cap inserting portion 6A by being inserted in the cap inserting portion 6A. Note that the cap 9 need not necessarily be the removable type, and that, for example, may be a screwed type screwed into the cap inserting portion 6A, or an openable type opened and closed to the cap inserting portion 6A.

Since the through hole 6 and the cap inserting portion 6A are closed in a state where the cap 9 has been fitted in the cap inserting portion 6A, foreign substances (dust, water, etc.) are prevented from entering the inside of the through hole 6. Furthermore, foreign substances (dust, water, etc.) are prevented from accumulating on the lock releasing portion 24 arranged so as to project or be exposed to the inside of the through hole 6.

The electric wire W that is extended from the connector fitting portion 10 is arranged at a lower part in such case body portion 5, and this electric wire W passes through the handle portion 7 to be pulled out to an outside. The locking arm 20, a fitting detecting arm 30, the releasing lever 40, and a lever holding arm 50 are provided at an upper part in the case body portion 5.

(Locking Arm)

Figure 3:
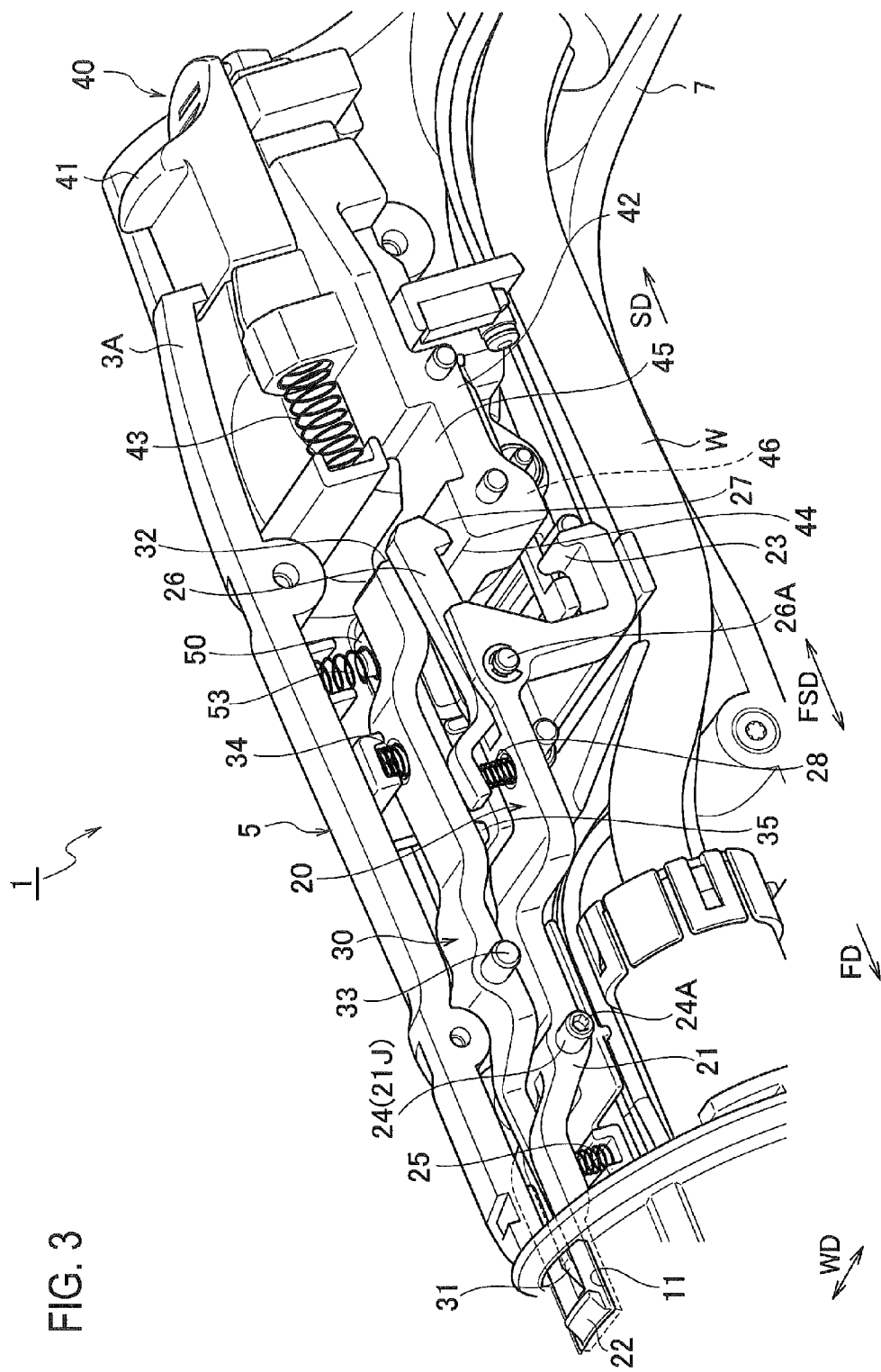
FIG. 3 is a perspective view showing the inside of the charging connector in accordance with the embodiment.

The locking arm 20 prevents separation of the charging connector 1 from the vehicle-side inlet 90 in a fitted state of the vehicle-side inlet 90 and the connector fitting portion 10. As shown in FIGS. 2 and 3, the locking arm 20 is configured by a main arm 21 provided rockably centering around a shaft core 21J in the case body portion 5, and a lock auxiliary arm 26 that rocks together with the main arm 21.

Figure 1:
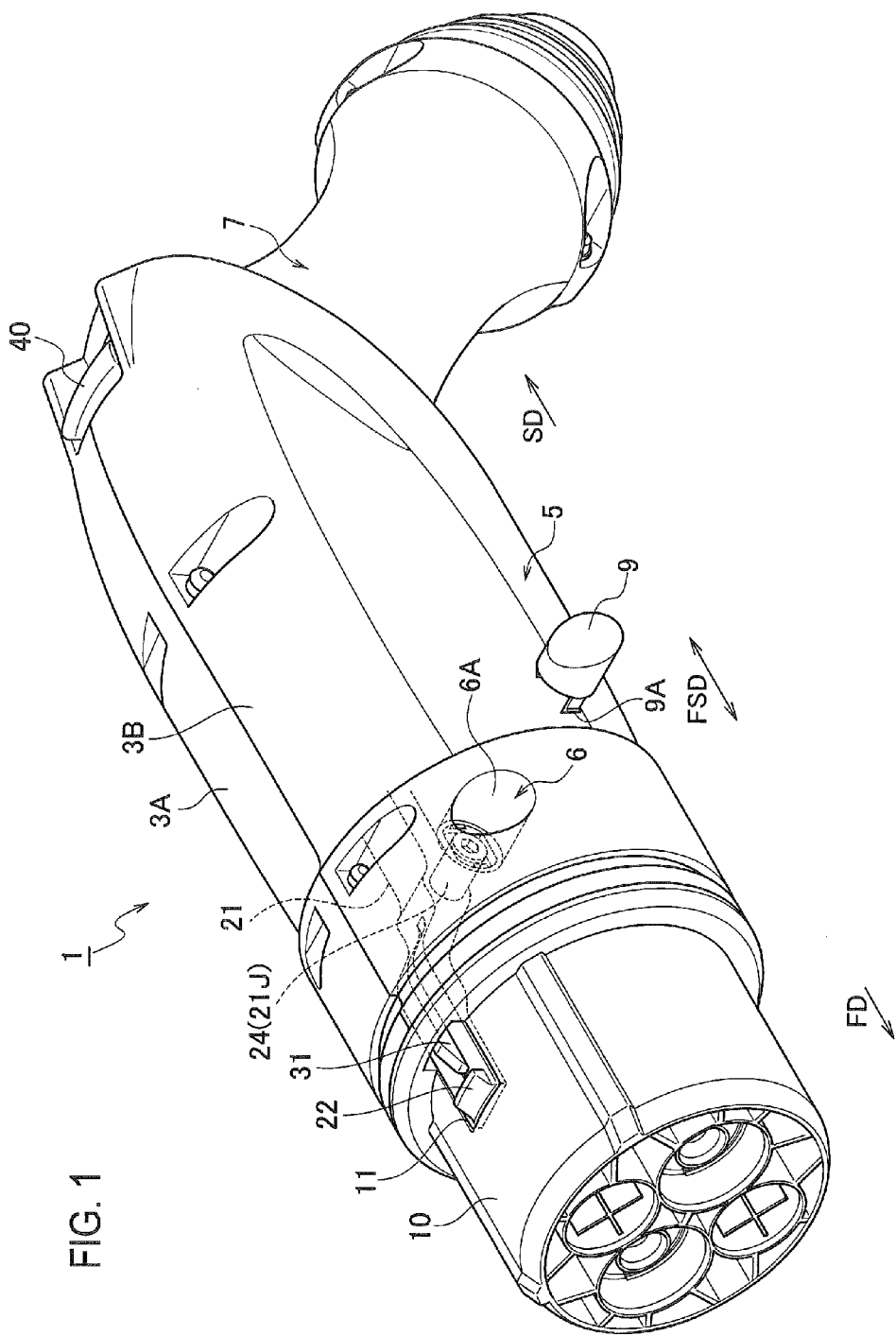
FIG. 1 is an entire perspective view showing a charging connector in accordance with the embodiment.

The main arm 21, as shown in FIGS. 1 to 3, includes: a locking claw 22 as a locking claw that is provided at a tip side of the main arm 21, and is retractable from the notch 11 of the connector fitting portion 10; a lock engaging piece 23 as an engaging portion that is provided at a rear end of the main arm 21, and is latched to a lower engaging groove portion 46, which will be mentioned later, of the releasing lever 40; and the lock releasing portion 24 with which the main arm 21 can be operated to a releasing position from an outside of the case body portion 5.

The main arm 21 is supported by the shaft core 21J and provided rockably centering around the shaft core 21J as a rocking shaft between a locking position where the locking claw 22 is latched to a latching groove portion 91 (refer to FIG. 2) provided at an inner peripheral surface of the vehicle-side inlet 90, and an unlocking position (a releasing position) where the latching of the locking claw 22 and the latching groove portion 91 is released. The main arm 21 is biased toward a direction (a top direction TD) in which the locking claw 22 projects from the notch 11 of the connector fitting portion 10 by a coil spring 25 as a biasing member.

The main arm 21 is bent in a bottom direction BD near the releasing lever 40. The main arm 21 extends along the separating direction SD from the bent lower end, and the lock engaging piece 23 is provided at a tip thereof.

The lock engaging piece 23 engages with the lower engaging groove portion 46, which will be mentioned later, of the releasing lever 40 at the unlocking position of the main arm 21 (i.e. a state where the locking claw 22 has retreated in the notch 11). Meanwhile, engagement of the lock engaging piece 23 with an upper latching groove portion 45, which will be mentioned later, of the releasing lever 40 is released at the locking position of the main arm 21 (i.e., a state where the locking claw 22 has projected from the notch 11).

The lock releasing portion 24 is inserted into the through hole 6 formed in the case body portion 5. That is, the lock releasing portion 24 is provided in the cap inserting portion 6A that forms the through hole 6. In the embodiment, the lock releasing portion 24 is configured by the shaft core 21J of the main arm 21 of the connector case 3B side. A jig inserting hole 24A into which a jig (not shown), such as a hexagonal bar spanner, is inserted is formed in the shaft core 21J.

The lock auxiliary arm 26, as shown in FIGS. 2 and 3, includes an auxiliary latching piece 27 that is provided at a rear end of the lock auxiliary arm 26, and is latched to the upper latching groove portion 45, which will be mentioned later, of the releasing lever 40.

The lock auxiliary arm 26 is provided rockably to the main arm 21 centering around a shaft core 26A provided at the main arm 21 between a locking position where the auxiliary latching piece 27 is latched to the upper latching groove portion 45, which will be mentioned later, of the releasing lever 40, and an unlatching position (a releasing position) where the latching of the auxiliary latching piece 27 and the upper latching groove portion 45 is released. The lock auxiliary arm 26 is biased in a latching direction (the bottom direction BD) of the auxiliary latching piece 27 by a coil spring 28.

Note that one end of the coil spring 28 is fixed to a position closer to a rear end side than the shaft core 21J in the main arm 21, and that an other end thereof is fixed to a position closer to a tip side than the shaft core 26A in the lock auxiliary arm 26. For that reason, in a situation where the auxiliary latching piece 27 has not been latched to the upper latching groove portion 45, the main arm 21 and the lock auxiliary arm 26 are provided rockably around the shaft core 21J, keeping a positional relation relative to each other by a restoring force of the coil spring 28.

The auxiliary latching piece 27 extends toward the bottom direction BD, and is provided latchably to the upper latching groove portion 45, which will be mentioned later, of the releasing lever 40. The auxiliary latching piece 27 is provided at a position facing the above-mentioned lock engaging piece 23. The auxiliary latching piece 27 is provided closer to the separating direction SD side than a detecting latching piece 32, which will be mentioned later, of the fitting detecting arm 30 and a holding latching piece 51, which will be mentioned later, of the lever holding arm 50.

When the lock engaging piece 23 moves to the unlocking position of the main arm 21 (i.e., the state where the locking claw 22 has been retreated in the notch 11), the shaft core 26A moves in the top direction TD. At this time, since the lock auxiliary arm 26 moves in the top direction TD, and further, the auxiliary latching piece 27 moves in the top direction TD by the restoring force of the coil spring 28, latching of the auxiliary latching piece 27 with the upper latching groove portion 45, which will be mentioned later, of the releasing lever 40 is released.

Meanwhile, when the lock engaging piece 23 moves to the locking position of the main arm 21 (i.e., the state where the locking claw 22 has projected from the notch 11), the shaft core 26A moves in the bottom direction BD. At this time, since the lock auxiliary arm 26 moves in the bottom direction BD, and further, the auxiliary latching piece 27 moves in the bottom direction BD by the restoring force of the coil spring 28, the auxiliary latching piece 27 can be latched with the upper latching groove portion 45, which will be mentioned later, of the releasing lever 40.

(Fitting Detecting Arm)

The fitting detecting arm 30 detects a completely fitted state of the vehicle-side inlet 90 and the connector fitting portion 10. The fitting detecting arm 30, as shown in FIGS. 2 and 3, includes: a detecting claw 31 that is provided at a tip side of the fitting detecting arm 30, and is retractable from the notch 11 of the connector fitting portion 10; and the detecting latching piece 32 that is provided at a rear end side of the fitting detecting arm 30, and is latched to the upper latching groove portion 45, which will be mentioned later, of the releasing lever 40, which will be mentioned later.

The fitting detecting arm 30 is provided rockably centering around a shaft core 33 between a fitting position where the detecting claw 31 comes into contact with a tip surface of the vehicle-side inlet 90, and detects fitting of the connector fitting portion 10 to the vehicle-side inlet 90, and a separating position where the contact of the detecting claw 31 and the vehicle-side inlet 90 is released, and where separation of the connector fitting portion 10 from the vehicle-side inlet 90 is detected. The fitting detecting arm 30 is biased toward a direction in which the detecting claw 31 projects to the notch 11 of the connector fitting portion 10 (i.e., a latching direction of the detecting latching piece 32) by a coil spring 34.

The detecting claw 31 is provided retractably (retreatably) from the notch 11 of the connector fitting portion 10 to an outside. The detecting claw 31 is provided closer to the separating direction SD side than the above-mentioned locking claw 22 of the main arm 21.

The detecting latching piece 32 extends toward the bottom direction BD, and is provided latchably to the upper latching groove portion 45, which will be mentioned later, of the releasing lever 40. The detecting latching piece 32 is provided closer to the fitting direction FD side than the auxiliary latching piece 27 of the lock auxiliary arm 26, and is provided closer to the separating direction SD side than the holding latching piece 51, which will be mentioned later, of the lever holding arm 50.

At the fitting position of the connector fitting portion 10 (i.e., a state where the detecting claw 31 has retreated in the notch 11 of the connector fitting portion 10), the fitting detecting arm 30 rocks centering around the shaft core 33, and thereby latching of the detecting latching piece 32 with the upper latching groove portion 45, which will be mentioned later, of the releasing lever 40 is released. Meanwhile, at the separating position of the connector fitting portion 10 (i.e., a state where the detecting claw 31 has projected from the notch 11 of the connector fitting portion 10), the fitting detecting arm 30 rocks centering around the shaft core 33, and thereby the detecting latching piece 32 is latched with the upper latching groove portion 45, which will be mentioned later, of the releasing lever 40.

A projection 35 (refer to FIGS. 2 and 3) projecting toward the bottom direction BD is provided between the detecting latching piece 32 and the shaft core 33. A tip side of the lever holding arm 50 (closer to the tip side than a shaft core 52, which will be mentioned later) is pressed toward the bottom direction BD, and thereby the projection 35 releases latching of the upper latching groove portion 45, which will be mentioned later, of the releasing lever 40 and the holding latching piece 51, which will be mentioned later, of the lever holding arm 50.

(Releasing Lever)

The releasing lever 40 releases latching of the latching groove portion 91 in the vehicle-side inlet 90 and the locking claw 22. The releasing lever 40 is slidably provided from a starting position of pushing operation to the case body portion 5 to a completing position (i.e., in a fitting separating direction FSD).

The releasing lever 40, as shown in FIGS. 2 and 3, has: a releasing switch 41 whose rear end is projected from the case body portion 5, and that moves in the fitting separating direction FSD; and a releasing body portion 42 that is provided in the case body portion 5 and is formed integrally with the releasing switch 41.

The releasing switch 41 is biased to a starting position of pushing operation of the releasing switch 41 (i.e., the separating direction SD side) by a coil spring 43. The releasing body portion 42 has a tip abutting portion 44 that abuts against and pushes up the auxiliary latching piece 27 of the lock auxiliary arm 26, the detecting latching piece 32 of the fitting detecting arm 30, and the holding latching piece 51, which will be mentioned later, of the lever holding arm 50, at the time of pushing operation of the releasing switch 41.

The tip abutting portion 44 rocks the main arm 21 to the unlocking position by abutting against an inclined surface 21A of the main arm 21 at a completing position of the pushing operation of the releasing switch 41. The tip abutting portion 44 is formed in a curved shape.

The upper latching groove portion 45 to which the auxiliary latching piece 27 of the lock auxiliary arm 26, the detecting latching piece 32 of the fitting detecting arm 30, and the holding latching piece 51, which will be mentioned later, of the lever holding arm 50 are respectively latched is provided at an upper part of a tip of the releasing body portion 42. Meanwhile, the lower engaging groove portion 46 as an engaged portion with which the lock engaging piece 23 of the main arm 21 engages is provided at a lower part of the tip of the releasing body portion 42.

(Lever Holding Arm)

The lever holding arm 50 holds the releasing lever 40 at the completing position of the releasing lever 40. The lever holding arm 50, as shown in FIGS. 2 and 3, includes the holding latching piece 51 that is latched to the upper latching groove portion 45 of the releasing lever 40 at a pressing position of the releasing lever 40, at a rear end side of the lever holding arm 50.

The lever holding arm 50 is provided rockably centering around the shaft core 52 between a lever holding position where the releasing lever 40 is held at the completing position (i.e., a state where the holding latching piece 51 is latched to the upper latching groove portion 45), and a lever non-holding position where the releasing lever 40 is not held (i.e., a state where the latching of the holding latching piece 51 and the upper latching groove portion 45 has been released).

A coil spring 53 is provided closer to the holding latching piece 51 side than the shaft core 52 of the lever holding arm 50, and the holding latching piece 51 side is biased toward the bottom direction BD by the coil spring 53. A side closer to a tip than the shaft core 52 of the lever holding arm 50 can abut against the projection 35 of the fitting detecting arm 30.

The holding latching piece 51 extends toward the bottom direction BD, and is provided latchably to the upper latching groove portion 45 of the releasing lever 40.

The holding latching piece 51 is provided closer to the fitting direction FD side than the auxiliary latching piece 27 of the lock auxiliary arm 26, and the detecting latching piece 32 of the fitting detecting arm 30.

The holding latching piece 51 latches with the upper latching groove portion 45 of the releasing lever 40 at the lever holding position. Meanwhile, at the lever non-holding position, the side closer to the tip than the shaft core 52 of the lever holding arm 50 is pressed by the projection 35, and the latching of the upper latching groove portion 45 of the releasing lever 40 and the holding latching piece 51 is released.

(Behavior of Charging Connector)

Next, behavior of the above-mentioned charging connector 1 will be explained with reference to the drawings. FIGS. 5 to 10 are views for illustrating the behavior of the charging connector 1 in accordance with the embodiment.

(Inserting Operation)

Figure 5:
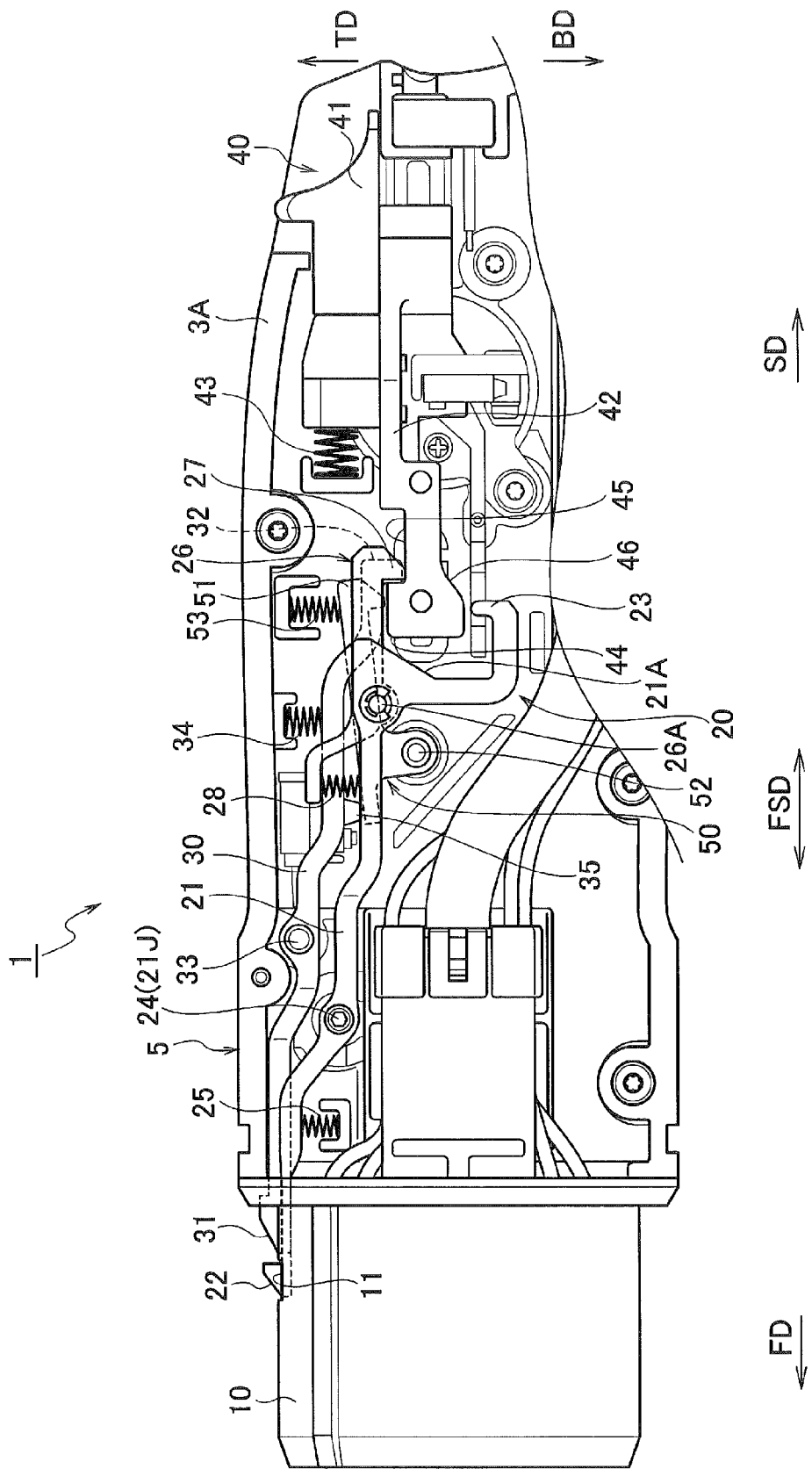
FIG. 5 is a view for illustrating behavior (a separated state) of the charging connector in accordance with the embodiment.

As shown in FIG. 5, in a separated state of the charging connector 1 from the vehicle-side inlet 90, the locking claw 22 of the main arm 21 and the detecting claw 31 of the fitting detecting arm 30 project from the notch 11 of the connector fitting portion 10 by biasing of the coil spring 25 and the coil spring 34, respectively.

At this time, the detecting latching piece 32 of the fitting detecting arm 30 is latched to the upper latching groove portion 45 of the releasing lever 40. In addition, since located closer to the separating direction SD side than the detecting latching piece 32, the auxiliary latching piece 27 is in a state of not being completely latched to the upper latching groove portion 45. When the detecting latching piece 32 and the upper latching groove portion 45 are unlatched in this state, the releasing body portion 42 of the releasing switch 41 moves toward the starting position of the pushing operation of the releasing switch 41 (i.e., the separating direction SD side) by a function of the coil spring 43, and the auxiliary latching piece 27 is latched to the upper latching groove portion 45. Therefore, in the separated state of the charging connector 1 from the vehicle-side inlet 90 as shown in FIG. 5, the auxiliary latching piece 27 is in a state of being able to be immediately latched with the upper latching groove portion 45, when the detecting latching piece 32 and the upper latching groove portion 45 are unlatched.

Figure 6:
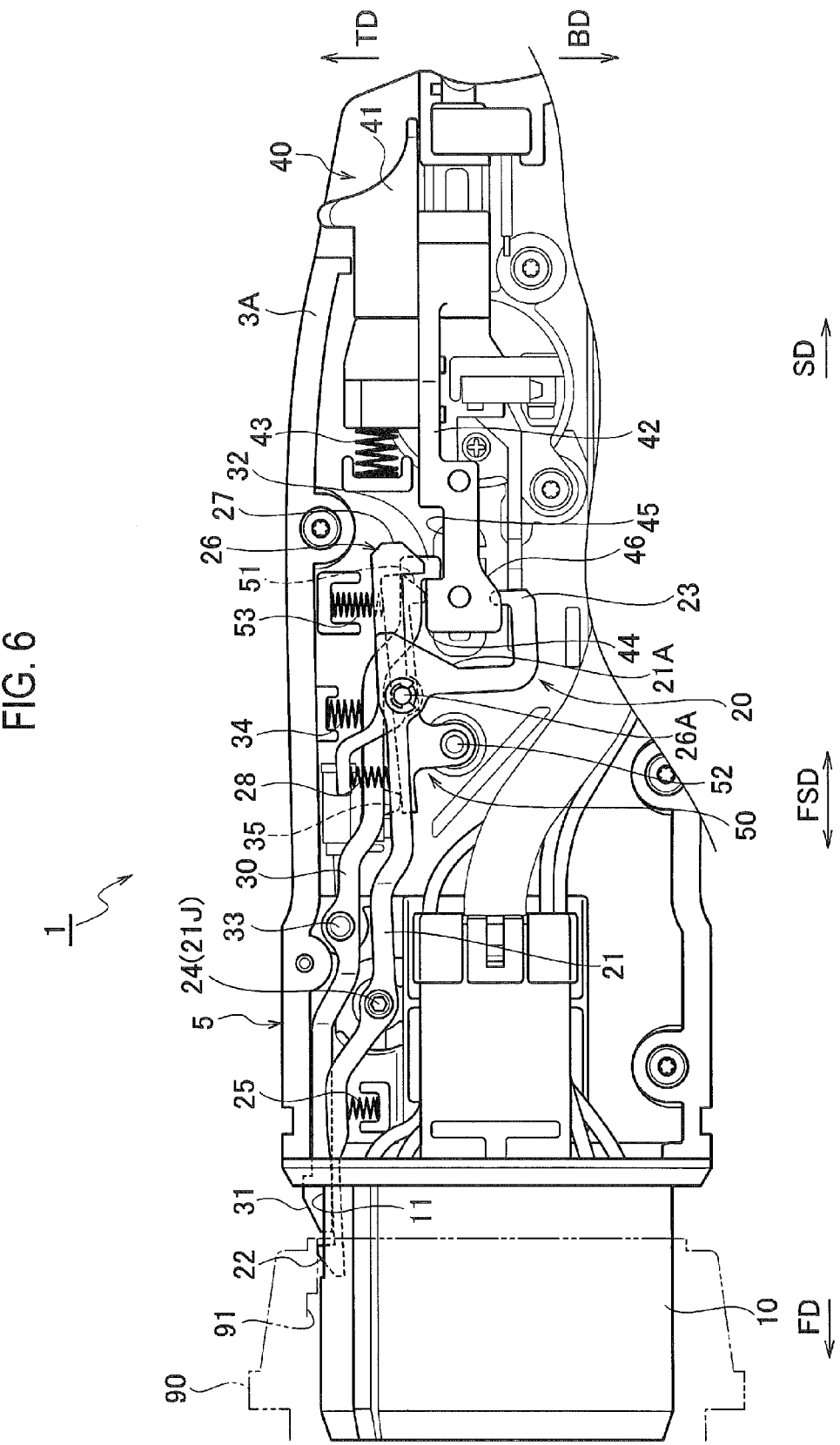
FIG. 6 is a view for illustrating behavior (a first intermediately fitted state) of the charging connector in accordance with the embodiment.

Next, as shown in FIG. 6, when the charging connector 1 is gradually fitted to the vehicle-side inlet 90 to thereby be in a first intermediately fitted state, the locking claw 22 retreats (is pushed) into the notch 11 of the connector fitting portion 10 by abutting of the inner peripheral surface of the vehicle-side inlet 90. In that case, the main arm 21 rocks, and the auxiliary latching piece 27 is unlatched from the upper latching groove portion 45. At this time, the lock engaging piece 23 of the main arm 21 is inserted in the lower engaging groove portion 46.

Figure 7:
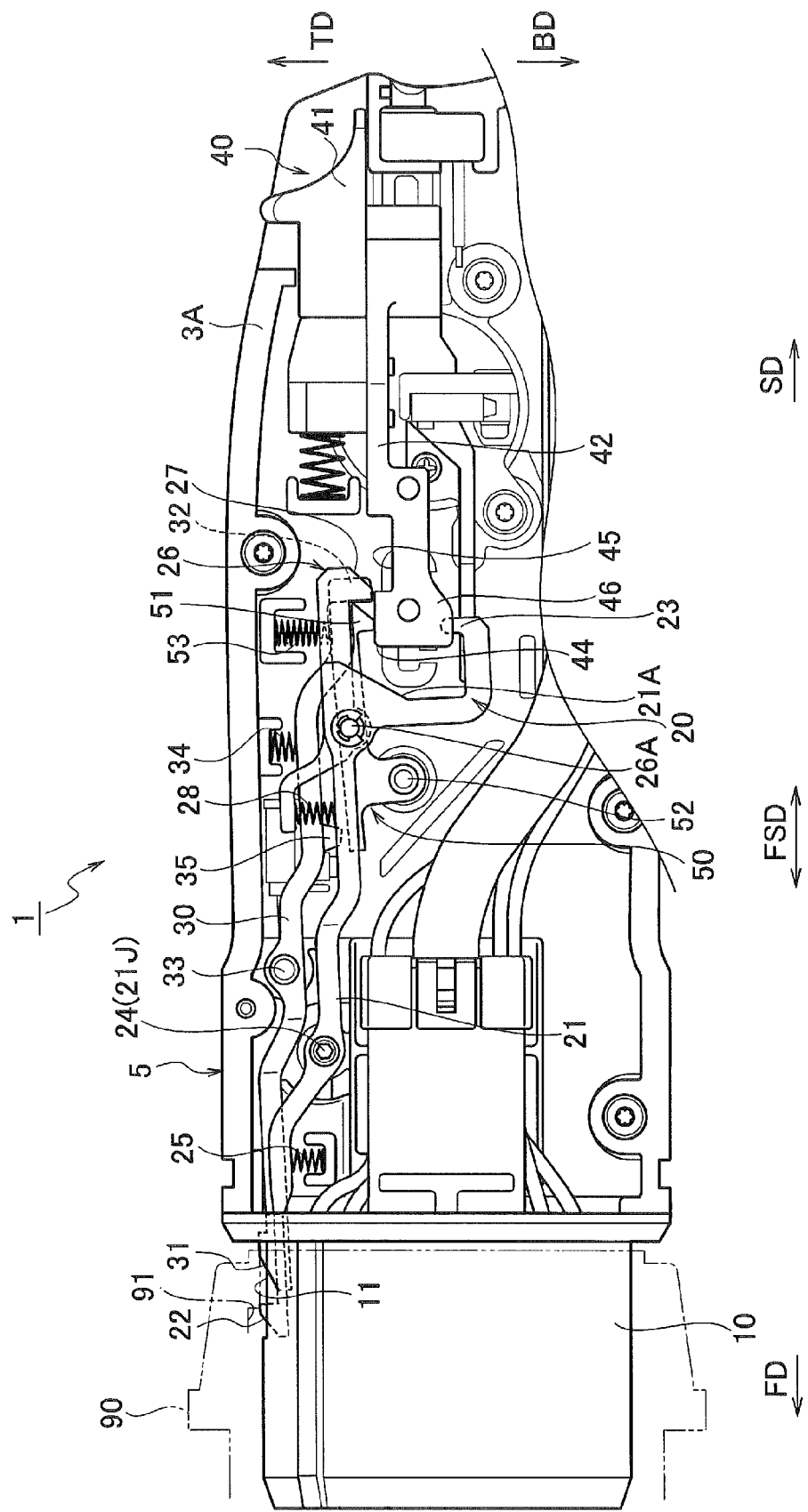
FIG. 7 is a view for illustrating behavior (a second intermediately fitted state) of the charging connector in accordance with the embodiment.

Next, as shown in FIG. 7, when the charging connector 1 is further fitted to the vehicle-side inlet 90 to thereby be in a second intermediately fitted state, the detecting claw 31 retreats (is pushed) into the notch 11 of the connector fitting portion 10 by abutting of the tip surface of the vehicle-side inlet 90. In that case, the fitting detecting arm 30 rocks, and the detecting latching piece 32 is unlatched from the upper latching groove portion 45. At this time, since the lock engaging piece 23 has been inserted in the lower engaging groove portion 46 of the releasing body portion 42, movement of the releasing lever 40 to the separating direction SD (the starting position side of the pushing operation) is still prevented.

Figure 8:
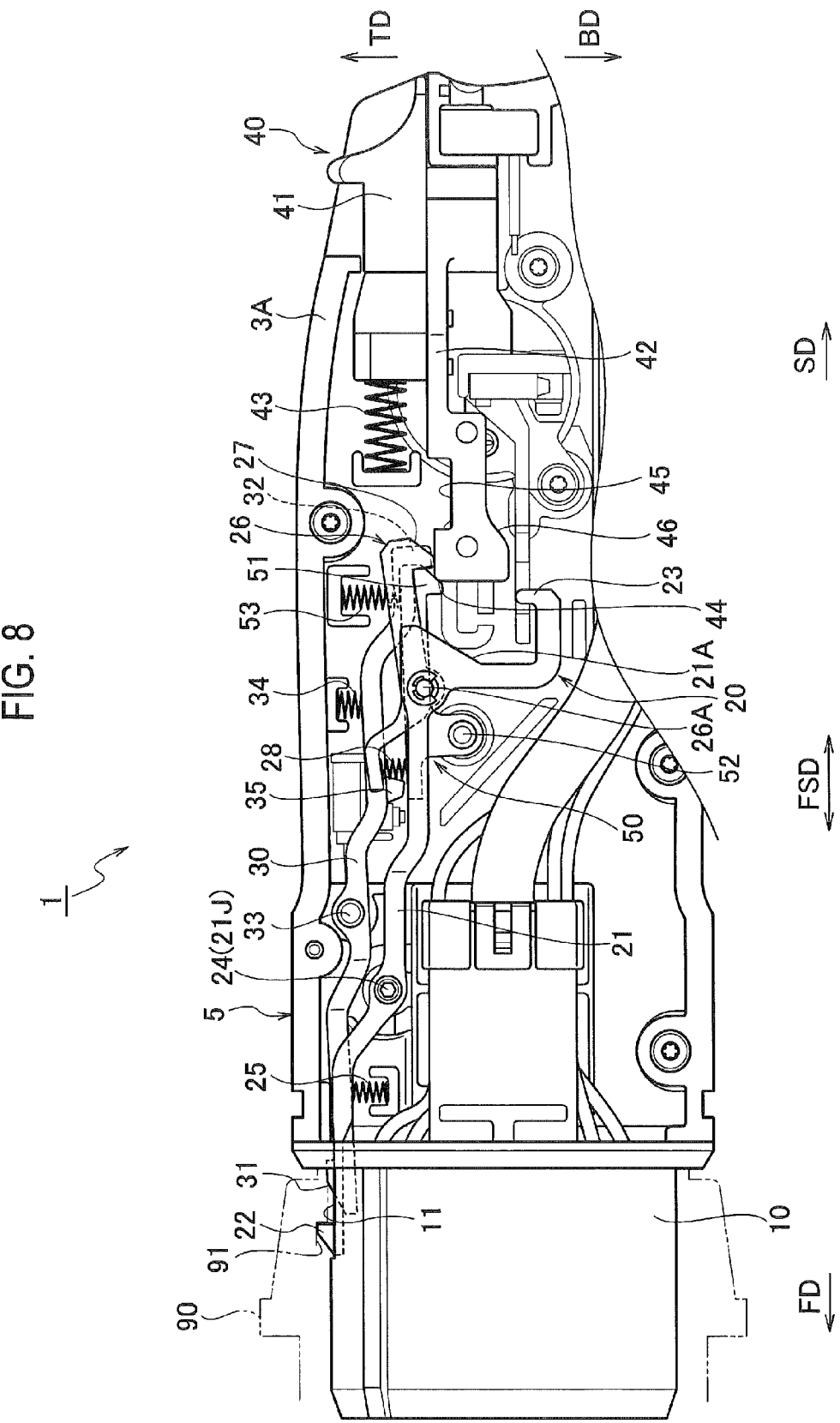
FIG. 8 is a view for illustrating behavior (a completely fitted state) of the charging connector in accordance with the embodiment.

Next, as shown in FIG. 8, when the charging connector 1 is completely fitted to the vehicle-side inlet 90 to thereby be in a completely fitted state, the main arm 21 rocks, the locking claw 22 projects from the notch 11 of the connector fitting portion 10, and thereby the main arm 21 is set to be at the locking position. In that case, the locking claw 22 is latched to the latching groove portion 91 of the vehicle-side inlet 90. In addition, since the lock engaging piece 23 is disengaged from the lower engaging groove portion 46, the releasing lever 40 moves to the separating direction SD side (the starting position side of the pushing operation).

As mentioned above, in the inserting operation, the charging connector 1 reaches the completely fitted state via each state of the first intermediately fitted state and the second intermediately fitted state in that order from the separated state.

(Extracting Operation)

Figure 9:
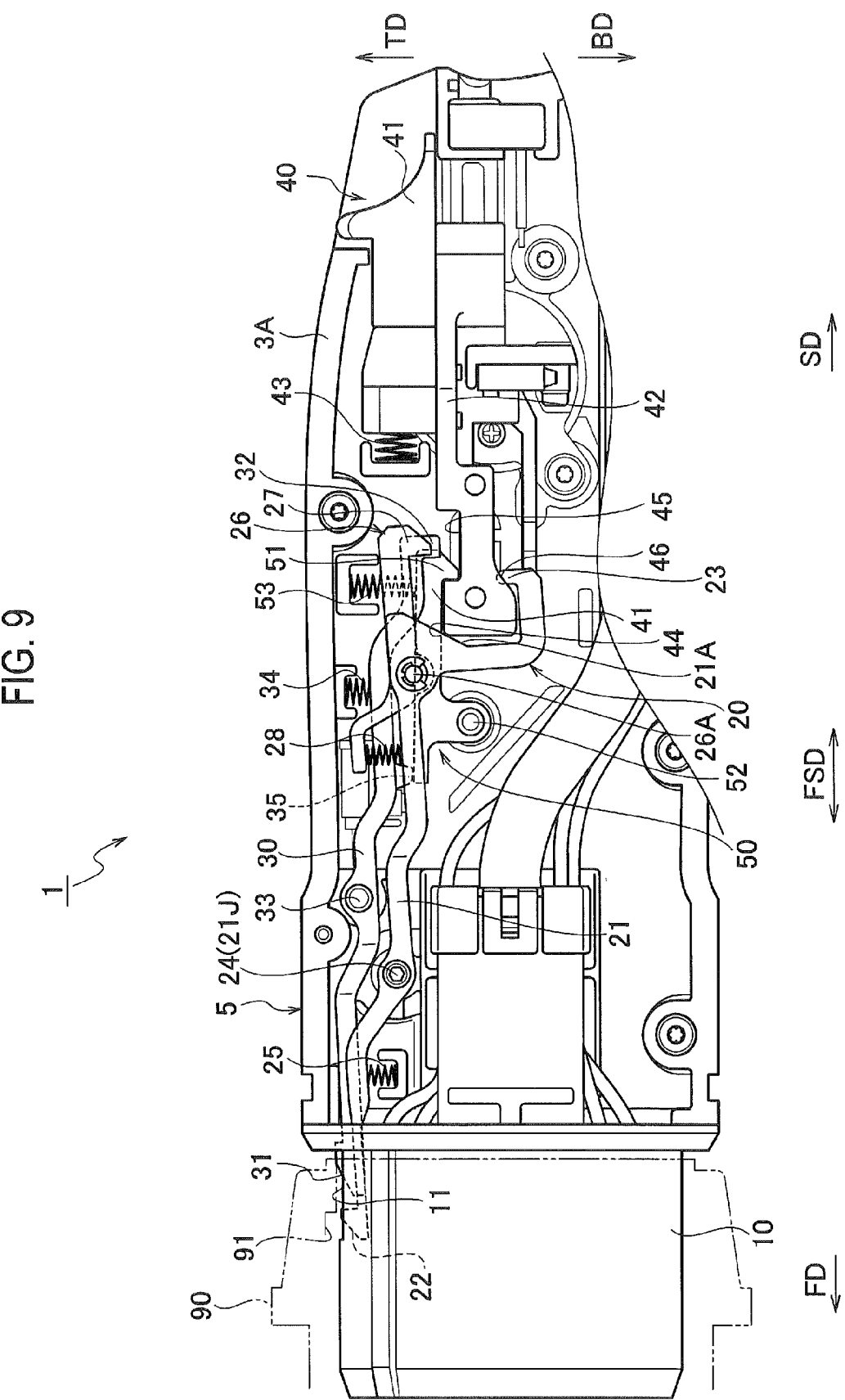
FIG. 9 is a view for illustrating behavior (a first intermediately extracted state) of the charging connector in accordance with the embodiment.

As shown in FIG. 9, when charge to a battery (not shown) mounted on a vehicle is ended, and the charging connector 1 is removed from the vehicle-side inlet 90, pushing operation of the releasing switch 41 of the releasing lever 40 is performed (the releasing switch 41 of the releasing lever 40 is pressed in the fitting direction FD side).

Additionally, at the completing position of the releasing lever 40, the tip abutting portion 44 of the releasing body portion 42 abuts against the inclined surface 21A of the main arm 21, the main arm 21 rocks, the locking claw 22 is pushed into the notch 11 of the connector fitting portion 10, and thereby the main arm 21 is set to be at the unlocking position.

In that case, the auxiliary latching piece 27 of the lock auxiliary arm 26 is pushed up from the upper latching groove portion 45, and the lock engaging piece 23 is inserted in the lower engaging groove portion 46. As a result of this, the releasing lever 40 is held at the completing position of the pushing operation, and the charging connector 1 becomes a first intermediately extracted state in which movement of the releasing lever 40 to the starting position side of the pushing operation is prevented.

Figure 10:
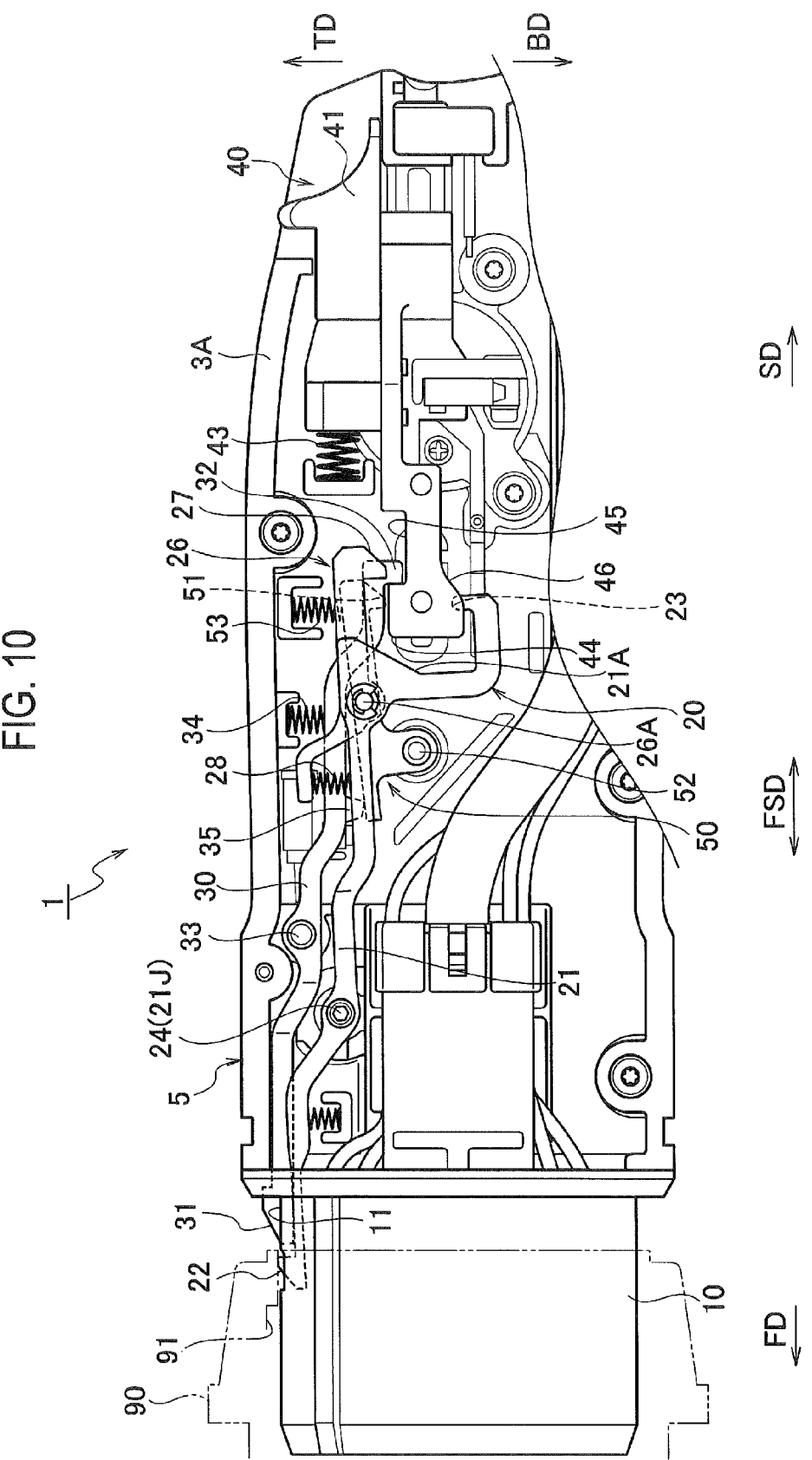
FIG. 10 is a view for illustrating behavior (a second intermediately extracted state) of the charging connector in accordance with the embodiment.
Figure 11:
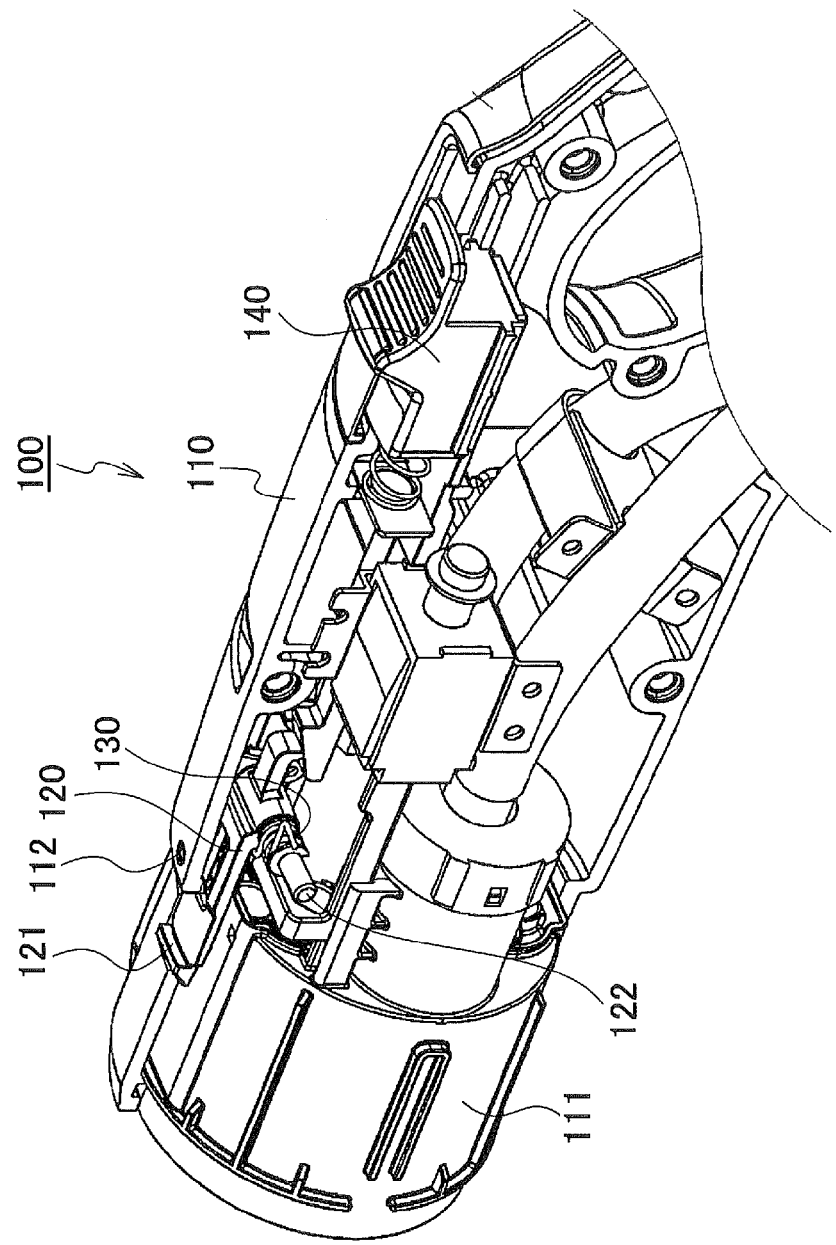
FIG. 11 is a perspective view showing a part of a charging connector in accordance with a background art.

Next, as shown in FIG. 10, when the charging connector 1 is gradually separated from the vehicle-side inlet 90, the fitting detecting arm 30 rocks, and the detecting claw 31 projects from the notch 11 of the connector fitting portion 10. In that case, the detecting latching piece 32 is latched to the upper latching groove portion 45. At this time, the projection 35 provided at a back surface side of the fitting detecting arm 30 rocks the lever holding arm 50, the holding latching piece 51 is unlatched from the upper latching groove portion 45, and the charging connector 1 becomes a second intermediately extracted state.

When the charging connector 1 is completely separated from the vehicle-side inlet 90, the charging connector 1 becomes a state before the above-mentioned inserting operation thereof (refer to FIG. 5).

As mentioned above, in the extracting operation, the charging connector 1 reaches the separated state via each state of the first intermediately extracted state and the second intermediately extracted state in that order from the completely fitted state.

(Action and Effect)

In the embodiment explained above, the locking arm 20 (the main arm 21) includes the lock releasing portion 24 that is inserted into the through hole 6 formed in the connector cases 3A, 3B, and with which the locking arm 20 can be operated to the releasing position from an outside of the connector cases 3A, 3B, and thereby the main arm 21 can be rocked so as to be at the releasing position from the outside of the connector cases 3A, 3B, even though a failure occurs in the releasing lever 40.

In addition, the lock releasing portion 24 is inserted into the through hole 6, the tip of the lock releasing portion 24 projects or is exposed to the inside of the through hole 6 from the shaft core inserting portion 6B, and thereby the gap between the shaft core inserting portion 6B and the lock releasing portion 24 is sealed. By the sealing, foreign substances (dust, water, etc.) are prevented from entering insides of the connector cases 3A, 3B through the shaft core inserting portion 6B of the through hole 6. In addition to that, since the jig inserted in the lock releasing portion 24 need not be inserted in the connector cases 3A, 3B from the through hole 6, it can also be prevented that the jig touches various parts (for example, the electric wire W and various terminals) in the connector cases 3A, 3B.

As described above, even though a latching state of the latching groove portion 91 of the vehicle-side inlet 90 and the locking claw 22 of the main arm 21 cannot be released by normal operation of the releasing lever 40, the main arm 21 can be rocked so as to be at the releasing position from the outside of the connector cases 3A, 3B, and moreover, the jig can be prevented from touching the various parts in the connector cases 3A, 3B.

In the embodiment, since the lock releasing portion 24 is configured by the shaft core 21J (the rocking shaft) provided at the main arm 21 of the locking arm 20, and thereby the lock releasing portion 24 need not be provided separately in addition to being provided at the shaft core 21J, reduction in weight, reduction in cost, etc. of the charging connector 1 can be achieved.

In the embodiment, the cap 9 is applied to the cap inserting portion 6A formed around the through hole 6, and closes the through hole 6, whereby erroneous operation in a normal condition of the charging connector 1 can be prevented, and foreign substances can be prevented from entering the cap inserting portion 6A and the jig inserting hole 24A of the shaft core 21J, and moreover, the charging connector 1 is superior also in appearance since the lock releasing portion 24 is not exposed.

In a state where the cap 9 has been fitted in the cap inserting portion 6A, the through hole 6 and the cap inserting portion 6A are closed, and foreign substances are prevented from entering the inside of the through hole 6. Additionally, since foreign substances (dust, water, etc.) are prevented from accumulating in the jig inserting hole 24A of the lock releasing portion 24 arranged so as to project or be exposed to the inside of the through hole 6, the locking arm 20 does not become non-releasable by accumulation of the foreign substances in the jig inserting hole 24A.

In the embodiment, the latching portion 9A is provided at the peripheral wall of the cap 9, and the latched portion 6C is provided at the side wall of the cap inserting portion 6A. That is, the cap 9 is a removable type that closes the through hole 6 and the cap inserting portion 6A by being inserted in the cap inserting portion 6A. As a result of this, application of the cap 9 to the cap inserting portion 6A becomes easy. Note that although the embodiment has been described such that the latching portion 9A is provided at the peripheral wall of the cap 9, and that the latched portion 6C is provided at the side wall of the cap inserting portion 6A of the through hole 6, a similar practical effect can be obtained even if a configuration is employed in which a latched portion is provided at the cap 9, and in which a latching portion is provided in the through hole 6.

(Other Embodiments)

As mentioned above, although contents of the present invention have been disclosed through the embodiment of the present invention, it should not be understood that statements and the drawings that form a part of this disclosure limit the present invention. From the disclosure, various alternative embodiments, practical examples, and operation technologies become apparent to those skilled in the art.

For example, the embodiment of the present invention can be changed as follows. Specifically, although the charging connector 1 has been explained as the one utilized for supplying electric power to the battery of the vehicle, the present invention is not limited to this, and can also be applied to an inlet of a power storage device mounted in transportation, such as a ship, a submarine, and an airplane other than the vehicle, an inlet of a power storage device installed in a home, a building, a factory, etc., and the like.

In addition, although the lock releasing portion 24 has been explained as the one configured by the shaft core 21J of the main arm 21, the present invention is not limited to this and, for example, the lock releasing portion 24 may be the one in which the locking claw 22 can be pushed near the locking claw 22 of the main arm 21.

In addition, although the through hole 6 has been explained as the one configured by the cap inserting portion 6A and the shaft core inserting portion 6B, the present invention is not limited to this, and the through hole 6 may be configured only by the shaft core inserting portion 6B.

In addition, although the cap 9 has been explained as the one applied to the shaft core inserting portion 6B, the present invention is not limited to this, and the cap 9 need not necessarily be provided.

Hereinbefore, although the embodiments of the present invention have been explained, these embodiments are mere exemplification described in order to facilitate understanding of the present invention, and the present invention is not limited to the embodiments. The technical scope of the present invention embraces not only specific technical matters disclosed in the above-described embodiments but various modifications, changes, alternative technologies, etc. that can be easily derived therefrom.

INDUSTRIAL APPLICABILITY

According to the features of the present invention, the locking arm includes the lock releasing portion with which the locking arm can be operated to the releasing position from the outside of the connector case, and thereby the locking arm can be rocked so as to be at the releasing position from the outside of the connector case, even though the failure occurs in the releasing lever. In addition, the lock releasing portion is inserted into the through hole, and thereby foreign substances can be prevented from entering the inside of the through hole. In addition to that, the jig need not be inserted in the connector case from the through hole, and can also be prevented from touching various parts in the connector case. As described above, even though the latching state of the vehicle-side inlet and the locking claw of the locking arm cannot be released by normal operation of the releasing lever, the locking arm can be rocked so as to be at the releasing position from the outside of the connector case, and moreover, the jig can be prevented from touching the various parts in the connector case.

REFERENCE SIGNS LIST 1 charging connector
3A, 3B connector case
5 case body portion
6 through hole
6A cap inserting portion 6B shaft core inserting portion
6C latched portion
7 handle portion
9 cap
9A latching portion
10 connector fitting portion
20 locking arm
21 main arm
21J shaft core (rocking shaft)
22 locking claw
24 lock releasing portion
25 coil spring
30 fitting detecting arm
40 releasing lever
50 lever holding arm
90 vehicle-side inlet (counterpart connector)

The invention claimed is:

1. A charging connector comprising:
a connector case that houses a connector fitting portion that is fitted to a counterpart connector;
a locking arm in which a locking claw retractable from an outer peripheral surface of the connector fitting portion is provided at a tip, and that rocks centering around a rocking shaft between a locking position where the locking claw engages with the counterpart connector and a releasing position where engagement of the counterpart connector and the locking claw is released; and
a biasing member that biases the locking arm toward the locking position, wherein
the locking arm includes a lock releasing portion that is inserted into a through hole formed in the connector case, and with which the locking arm can be operated to the releasing position from an outside of the connector case with the locking arm rocking centering around the rocking shaft and supported by the rocking shaft, and
the locking arm is pivotally supported around the through hole via the lock releasing portion.

2. A charging connector comprising:
a connector case that houses a connector fitting portion that is fitted to a counterpart connector;
a locking arm in which a locking claw retractable from an outer peripheral surface of the connector fitting portion is provided at a tip, and that rocks centering around a rocking shaft between a locking position where the locking claw engages with the counterpart connector and a releasing position where engagement of the counterpart connector and the locking claw is released; and
a biasing member that biases the locking arm toward the locking position, wherein
the locking arm includes a lock releasing portion that is inserted into a through hole formed in the connector case, and with which the locking arm can be operated to the releasing position from an outside of the connector case with the locking arm rocking centering around the rocking shaft and supported by the rocking shaft, and
the lock releasing portion is configured by the rocking shaft of the locking arm.

3. A charging connector comprising:
a connector case that houses a connector fitting portion that is fitted to a counterpart connector;
a locking arm in which a locking claw retractable from an outer peripheral surface of the connector fitting portion is provided at a tip, and that rocks centering around a rocking shaft between a locking position where the locking claw engages with the counterpart connector and a releasing position where engagement of the counterpart connector and the locking claw is released; and
a biasing member that biases the locking arm toward the locking position, wherein
the locking arm includes a lock releasing portion that is inserted into a through hole formed in the connector case, and with which the locking arm can be operated to the releasing position from an outside of the connector case with the locking arm rocking centering around the rocking shaft and supported by the rocking shaft, and
a cap to close the through hole is applied to the through hole.

4. The charging connector according to claim 3, wherein a latching portion is provided at either one of the through hole and the cap, and a latched portion to which the latching portion is latched is provided at the other.

* * * * *